May 15, 1934. H. H. POLK, JR Re. 19,167

FOUNTAIN PEN

Original Filed July 20, 1931

Inventor
Henry H. Polk jr.
by Olwig & Hague Attys.

Reissued May 15, 1934

Re. 19,167

UNITED STATES PATENT OFFICE 19,167

FOUNTAIN PEN

Henry H. Polk, Jr., Des Moines, Iowa, assignor to W. A. Sheaffer Pen Company, Fort Madison, Iowa, a corporation of Delaware Original No. 1,926,405, dated September 12, 1933, Serial No. 551,913, July 20, 1931. Application for reissue March 12, 1934, Serial No. 715,255

3 Claims. (Cl. 120—47)

My invention relates to that class of fountain pens in which ink or air contained within the pen barrel is displaced from one side to the other of the plunger during the stroke of the latter away from the pen, and a partial vacuum is established in the barrel and the ink or air is expelled therefrom during the stroke of the plunger toward the pen, and whereby the barrel is substantially filled with ink drawn into the barrel by the partial vacuum when the plunger reaches its limit of movement toward the pen with a single movement of the plunger.

The object of my invention is to provide a fountain pen of this class of simple, durable and inexpensive construction, and of few parts.

More specifically it is my object to provide a plunger for pens of this character in which the ink or air contained within the barrel will be freely displaced from one side of the plunger to the other side thereof during the stroke of the plunger away from the pen point, and at the very beginning of the movement of the plunger toward the pen the plunger will be tightly sealed to the pen barrel to thereby create a maximum degree of vacuum within the barrel behind the plunger and to expel the ink or air in front of the plunger during the stroke of the plunger toward the pen.

Figure 1:
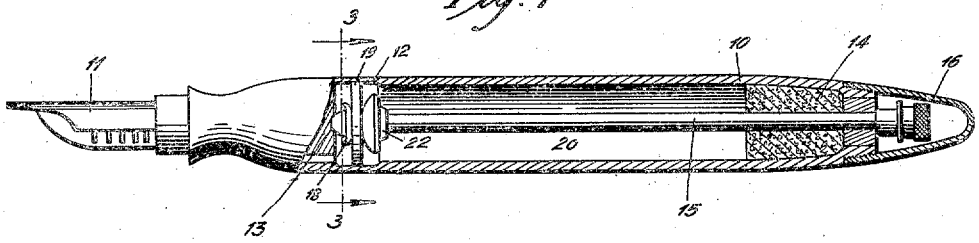
Figure 2:
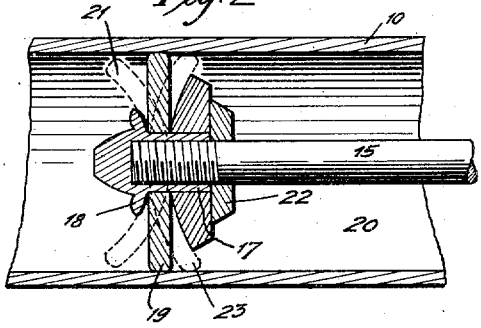
Figure 3:
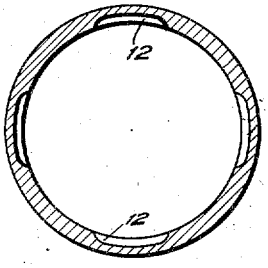

My invention consists in the construction, arrangement and combination of the various parts of the device, whereby the objects contemplated are attained, as hereinafter more fully set forth, pointed out in my claims, and illustrated in the accompanying drawing, in which:

Figure 1 shows a longitudinal sectional view of a fountain pen embodying my invention with the plunger shown at its limit of movement toward the pen point;

Fig. 2 shows an enlarged detail sectional view of a portion of the pen barrel and the plunger in position therein. The dotted lines show the position of the plunger disk during the displacement stroke of the plunger, and also the position of the plunger disk when moving toward the pen point to create a partial vacuum within the barrel; and Fig. 3 shows an enlarged, detail, transverse, sectional view through the barrel at the point adjacent to which the plunger is situated when at its limit of movement toward the pen.

Referring to the accompanying drawing, I have used the reference numeral 10 to indicate generally the pen barrel of usual construction, having a hollow cylindrical interior. At one end is the pen point 11, and at a point in the barrel near the pen point there are a number of grooves 12, shown in Fig. 3, and whereby communication is established between the interior of the pen barrel and the pen point through a passageway such as 13 when the plunger is at its limit of movement toward the pen barrel.

At the end of the barrel opposite the pen point is a packing 14, and slidingly extended through this packing is the plunger rod 15. A screw cap 16 is preferably provided for covering the handle end of the plunger.

The plunger proper comprises a sleeve 17 screwed on the end of the plunger rod adjacent to the pen point, and formed on this sleeve is a plunger disk retaining member 18 of comparatively small diameter, and inclined outwardly and toward the pen point. Mounted upon this sleeve 17 is the plunger disk indicated generally by the numeral 19. This disk is formed of a resilient and slightly compressible material, such for instance as rubber.

This plunger disk is normally flat and is made slightly larger in diameter than the interior of the barrel, so that when it is in its flat condition it presses tightly against the interior of the barrel. It may, however, be moved a slight degree to position shown by dotted lines at 23 in Fig. 2, and still maintain tight contact with the interior of the barrel. When, however, it is moved to position shown by the dotted lines 21 in Fig. 2, its periphery stands clear of the barrel so that ink or air may pass by it.

Mounted upon the sleeve 17 is a disk holding plate 22 of a diameter slightly less than that of the interior of the pen barrel, and having its face adjacent to the disk inclined slightly in a direction away from the pen point.

This disk holding plate 22 is fixed to the sleeve 17 so that it together with the part 18 forms a means for clamping the central portion of the disk firmly in position.

In practical use, and assuming that there is a small quantity of ink within the barrel and it is desired to refill it, the operator first removes the cap 16, then grasps the handle end of the plunger rod and moves it in a direction away from the pen point. During this movement the air and ink contained within the barrel will press upon the plunger disk sufficiently to cause it to assume the position shown by the dotted lines 21, so that the air and ink may pass around the periphery of the plunger disk and occupy a position in the barrel on the opposite side of the plunger.

As soon as the plunger disk has reached its limit of movement away from the pen, then the plunger disk, on account of its resiliency, will spring back to a substantially flat position with its periphery firmly in engagement with the interior of the barrel. Then at the instant when the plunger is moved in a direction toward the pen point, the plunger disk will form a tight connection with the interior of the barrel, and as the movement is continued, it will assume the position shown by dotted lines 23 in Fig. 2, and its periphery will be held firmly in contact with the interior of the barrel throughout the entire movement of the plunger toward the pen point, so that air or ink will be expelled from the barrel in front of the plunger and a maximum degree of vacuum will be created within the entire barrel at the rear of the plunger.

By reason of the fact that the disk holding plate 22 is of a diameter slightly less than that of the interior of the pen barrel, that the plunger disk 19 is of a larger diameter than the interior of the barrel, and that the face of the plate adjacent to the plunger disk 19 is inclined slightly in a direction away from the pen point, all of which is hereinabove stated, a wedging action of said plunger disk 19 is obtained between the periphery of the plate 22 and the internal wall of the pen barrel upon movement of the plunger rod 15 in one direction and such action provides a substantially air-tight engagement between the plunger and the wall. Then when the plunger disk reaches the grooves 12 in the barrel, and assuming that the pen point is inserted in ink, the ink will be drawn into the pen point and the passageway 12 to approximately fill the barrel.

Thus the complete operation of expelling the contents of the barrel and the filling of the barrel with ink is done with a single stroke of the plunger in one direction.

The efficiency and practicability of a device of this kind is dependent upon the amount of vacuum which may be produced in the pen barrel upon a single stroke of the plunger toward the pen point, and hence it is essential that at the very start of the plunger movement toward the pen point a tight connection is made between the plunger disk and the interior of the barrel.

I am aware that for somewhat analogous purposes plungers have been employed containing cup-shaped packings which will permit air or liquid to pass around them when moving in one direction and form a tight connection with the interior of the barrel when being moved in the opposite direction, but with these cup-shaped packings it is necessary to move them a greater or less distance before the cup-shaped packing forms a tight joint with the interior of the barrel, and hence an attempt to employ a packing of this character in a fountain pen would result in a considerably less amount of vacuum being produced, and hence the pen barrel would be only partly filled during a single stroke of the plunger.

With my improvement, however, and by employing a normally disk-shaped plunger disk, the packing forms a tight connection with the barrel before and at the commencement of the stroke toward the pen point, and hence a maximum degree of vacuum is created during a single stroke of the plunger toward the pen point.

I claim as my invention:

1. An improved fountain pen comprising a hollow cylindrical barrel, a pen at one end thereof, a groove formed on the interior of the barrel near the pen point, the pen being formed with a passageway communicating between said groove and the pen point, a plunger rod slidingly mounted in the end of the barrel opposite the pen point, a plunger on the plunger rod comprising a flat disk formed of yielding resilient material of such diameter that when in position extending straight outwardly from the plunger rod it will be slightly under compression, and when the plunger rod is moved in either direction the friction of the plunger against the pen barrel will cause its outer portion to incline rearwardly relative to the direction in which the piston is moving, means secured to the piston rod on one side of the piston for limiting said inclining movement to such position that the piston retains contact with the pen barrel, and means secured to the piston rod at the opposite side of the piston for engaging the central portion of the piston but permitting said inclining movement to extend to such an amount as to permit the periphery of the piston to stand spaced apart from the pen barrel.

2. The combination with a fountain pen having a hollow cylindrical barrel and a pen point at one end thereof, of a plunger rod slidingly mounted in the other end thereof, a plunger on the plunger rod comprising a normally flat disk formed of yielding resilient material of a diameter larger than the internal diameter of said barrel whereby a movement in either longitudinal direction will cause a rearward inclination of said plunger relative to the direction of movement, means secured to said plunger rod on one side of said plunger for forcing a substantially air-tight engagement of said plunger with said internal diameter upon movement of said plunger rod in one direction, and means secured to said plunger rod on the other side of said plunger for permitting a spaced relation of said plunger with said internal diameter upon movement of said plunger rod in the other direction.

3. The combination with a fountain pen having a hollow cylindrical barrel and a pen point at one end thereof, of a plunger rod slidingly mounted in the other end thereof, a plunger on the plunger rod comprising a normally flat disk formed of yielding resilient material of a diameter larger than the internal diameter of said barrel whereby a movement in either longitudinal direction will cause a rearward inclination of said plunger relative to the direction of movement, a plate secured to said plunger rod having a face for engaging one side of said plunger, said plate being of a diameter less than the internal diameter of said barrel and said face being inclined in a direction away from said plunger to afford a wedging action of said plunger between said plate and the internal wall of said barrel upon movement of said plunger rod in one direction whereby a substantially air-tight engagement is obtained, and a plunger retaining member on the other side of said plunger for permitting a spaced relation of said plunger with said internal wall upon movement of said plunger in the other direction.

HENRY H. POLK, JR.